(12) United States Patent  
Wang et al.

(10) Patent No.: US 11,230,013 B2
(45) Date of Patent: Jan. 25, 2022

(54) CALIBRATION SYSTEM AND CALIBRATION METHOD OF ROBOT

(71) Applicant: FANUC CORPORATION, Yamanashi (JP)

(72) Inventors: Yuelai Wang, Yamanashi (JP); Soichi Arita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 310 days.

(21) Appl. No.: 16/511,285

(22) Filed: Jul. 15, 2019

(65) Prior Publication Data

US 2020/0078947 A1 Mar. 12, 2020

(30) Foreign Application Priority Data

Sep. 11, 2018 (JP) .............................. JP2018-169336

(51) Int. Cl.
*B25J 9/16* (2006.01)

(52) U.S. Cl.
CPC ........... *B25J 9/1692* (2013.01); *B25J 9/1697* (2013.01)

(58) Field of Classification Search
CPC .... B25J 9/1692; B25J 9/1697; B25J 19/0095; G05B 2219/39018; G01B 21/00; G01B 21/02; G01B 21/22
USPC ................................................ 700/245–264
See application file for complete search history.

(56) References Cited

U.S. PATENT DOCUMENTS

| 4,763,276 A * | 8/1988 | Perreirra ................ B25J 9/1653 700/254 |
| 8,369,993 B2 * | 2/2013 | Kagawa ................. B25J 9/1692 700/263 |
| 8,786,243 B2 * | 7/2014 | Mori .................... G05B 19/404 318/632 |

(Continued)

FOREIGN PATENT DOCUMENTS

| CN | 105397807 A | 3/2016 |
| EP | 3 112 096 A1 | 1/2017 |

(Continued)

OTHER PUBLICATIONS

Japanese Office Action dated Sep. 15, 2020, in connection with corresponding JP Application No. 2018-169336 (11 pp., including machine-generated English translation).

*Primary Examiner* — Jaime Figueroa
(74) *Attorney, Agent, or Firm* — Maier & Maier, PLLC

(57) ABSTRACT

A calibration system of a robot includes a data storage unit that stores a number of pieces of data in which actual measured position information obtained by actually measuring a tip position of the robot and information indicating a state of the robot upon actual measurement are combined, a parameter selecting unit that selects mechanical error parameters to be identified from parameters indicating mechanical errors of the robot, a parameter identifying unit that identifies each of the mechanical error parameters using the stored data and information of the selected mechanical error parameters, and an identification result evaluating unit that evaluates an identification result, and, in the case where evaluation does not satisfy a predetermined criterion, selection of different mechanical error parameters by the parameter selecting unit, identification and evaluation are repeated.

6 Claims, 6 Drawing Sheets

(56) References Cited

U.S. PATENT DOCUMENTS

| | | | |
|---|---|---|---|
| 2008/0188986 A1* | 8/2008 | Hoppe | B25J 9/1692 |
| | | | 700/263 |
| 2010/0168915 A1* | 7/2010 | Kagawa | B25J 9/1692 |
| | | | 700/254 |
| 2010/0191374 A1* | 7/2010 | Tsai | G05B 19/404 |
| | | | 700/258 |
| 2011/0202308 A1* | 8/2011 | Kishida | G01D 5/2449 |
| | | | 702/151 |
| 2012/0239194 A1 | 9/2012 | Kagawa | |
| 2017/0066131 A1 | 3/2017 | Kamikawa et al. | |
| 2017/0266811 A1* | 9/2017 | Ogawara | B25J 9/1633 |
| 2018/0222048 A1* | 8/2018 | Hasegawa | B25J 9/1697 |
| 2018/0222057 A1* | 8/2018 | Mizobe | B25J 9/1697 |
| 2018/0225113 A1* | 8/2018 | Hasegawa | B25J 9/161 |
| 2019/0143513 A1* | 5/2019 | Rabindran | B25J 9/1641 |
| | | | 700/245 |
| 2019/0217468 A1* | 7/2019 | Ogata | B25J 9/1651 |
| 2020/0016758 A1 | 1/2020 | Keller et al. | |

FOREIGN PATENT DOCUMENTS

| | | |
|---|---|---|
| JP | H06-031665 A | 2/1994 |
| JP | H06-236205 A | 8/1994 |
| JP | H06-274213 A | 9/1994 |
| JP | H07-28514 A | 1/1995 |
| JP | 2012-196716 A | 10/2012 |
| JP | 2013-132731 A | 7/2013 |
| WO | 2015/129473 A1 | 9/2015 |
| WO | 2017/033247 A1 | 3/2017 |
| WO | 2018/114041 A1 | 6/2018 |

\* cited by examiner

CALIBRATION SYSTEM AND CALIBRATION METHOD OF ROBOT

CROSS-REFERENCE TO RELATED APPLICATIONS

This application claims the benefit of Japanese Patent Application No. 2018-169336, the content of which is incorporated herein by reference.

FIELD

The present invention relates to a calibration system and a calibration method of a robot.

BACKGROUND

Conventionally, a technique is known which improves absolute accuracy of a tip of a robot by identifying a plurality of mechanical error parameters so that a difference between actual measured position information obtained by measuring tip position information in a plurality of attitudes of an articulated type robot by utilizing three-dimensional position measuring equipment and a theoretical position of the tip calculated by kinematically forward converting angle data of each rotary joint and a length of a link becomes a minimum (see, for example, Japanese Unexamined Patent Application, Publication No. H07-28514).

In the technique disclosed in Japanese Unexamined Patent Application, Publication No. H07-28514, the mechanical error parameters to be identified are grouped into three groups of attitude parameters, linear motion direction parameters and translational parameters, and all the mechanical error parameters within the groups are sequentially identified in this order.

SUMMARY

One aspect of the present invention is a calibration system of a robot including a data storage unit that stores a plurality of pieces of data in which actual measured position information obtained by actually measuring a tip position of the robot and information indicating a state of the robot upon actual measurement of the actual measured position information are combined, a parameter selecting unit that selects mechanical error parameters to be identified from parameters indicating mechanical errors of the robot, a parameter identifying unit that identifies each of the mechanical error parameters using the data stored in the data storage unit and information of the mechanical error parameters selected by the parameter selecting unit, and an identification result evaluating unit that evaluates an identification result by the parameter identifying unit, in which, in the case where evaluation by the identification result evaluating unit does not satisfy a predetermined criterion, selection of different mechanical error parameters by the parameter selecting unit, identification by the parameter identifying unit and evaluation by the identification result evaluating unit are repeated.

Further, another aspect of the present invention is a calibration method of a robot including storing a plurality of pieces of data in which actual measured position information obtained by actually measuring a tip position of the robot and information indicating a state of the robot upon actual measurement of the actual measured position information are combined, selecting mechanical error parameters to be identified from parameters indicating mechanical errors of the robot, identifying each of the mechanical error parameters using the stored data and information of the selected mechanical error parameters, evaluating an identification result, and, in the case where evaluation does not satisfy a predetermined criterion, repeating selection of different mechanical error parameters, identification and evaluation.

DETAILED DESCRIPTION

A calibration system 1 of a robot according to one embodiment of the present invention will be described below with reference to the drawings.

Figure 1:
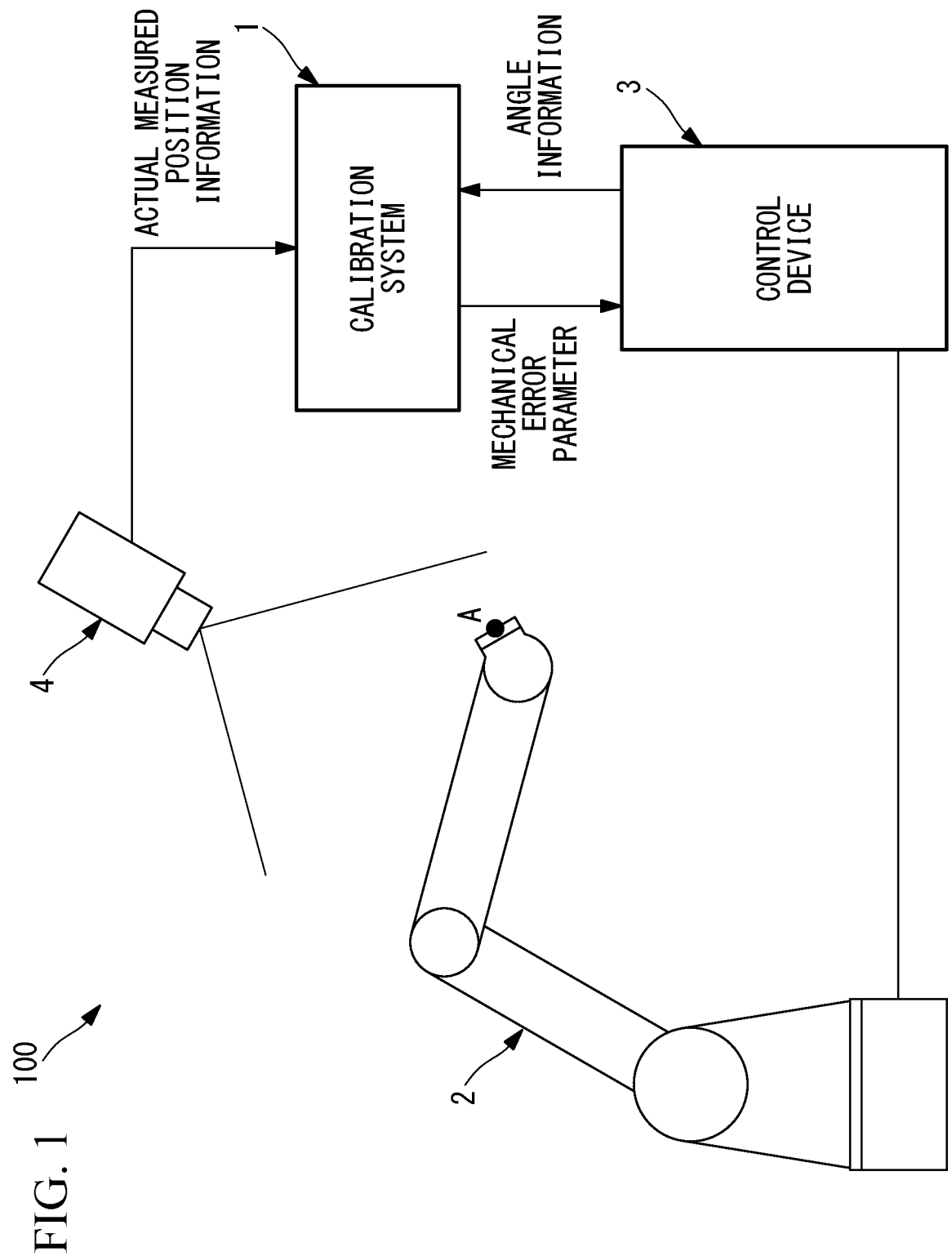
FIG. 1 is an overall configuration diagram illustrating a robot system including a calibration system according to one embodiment of the present invention.

As illustrated in FIG. 1, the calibration system 1 according to the present embodiment is a system which is connected to a system including a robot 2, a control device 3 connected to the robot 2 and three-dimensional position measuring equipment 4 which actually measures a tip position A of the robot 2 from outside, and which sets mechanical error parameters to be used for calculating the tip position at the control device 3.

The robot 2 is, for example, an articulated type robot. The control device 3 converts angle information detected by an encoder of each rotary joint (joint) of the robot 2 which is an articulated type robot and length information of a link into theoretical position information (hereinafter, referred to as a theoretical position) of the tip position of the robot 2 in a fixed three-dimensional orthogonal coordinate system through kinematic forward conversion. However, there occurs an individual difference in the length of the link, or the like, due to a machining error and an assembling error of components of the robot 2.

Therefore, to calculate theoretical position information, by performing modeling using a plurality of mechanical error parameters such as a DH parameter including the length of the link and an amount of deflection occurring by load torque of the rotary joint in addition to the information indicating the state of the robot 2 such as the angle information, and identifying mechanical error parameters so that a difference between an actual measured position and a theoretical position becomes a minimum, it is possible to improve absolute position accuracy of the tip position to be calculated.

Figure 2:
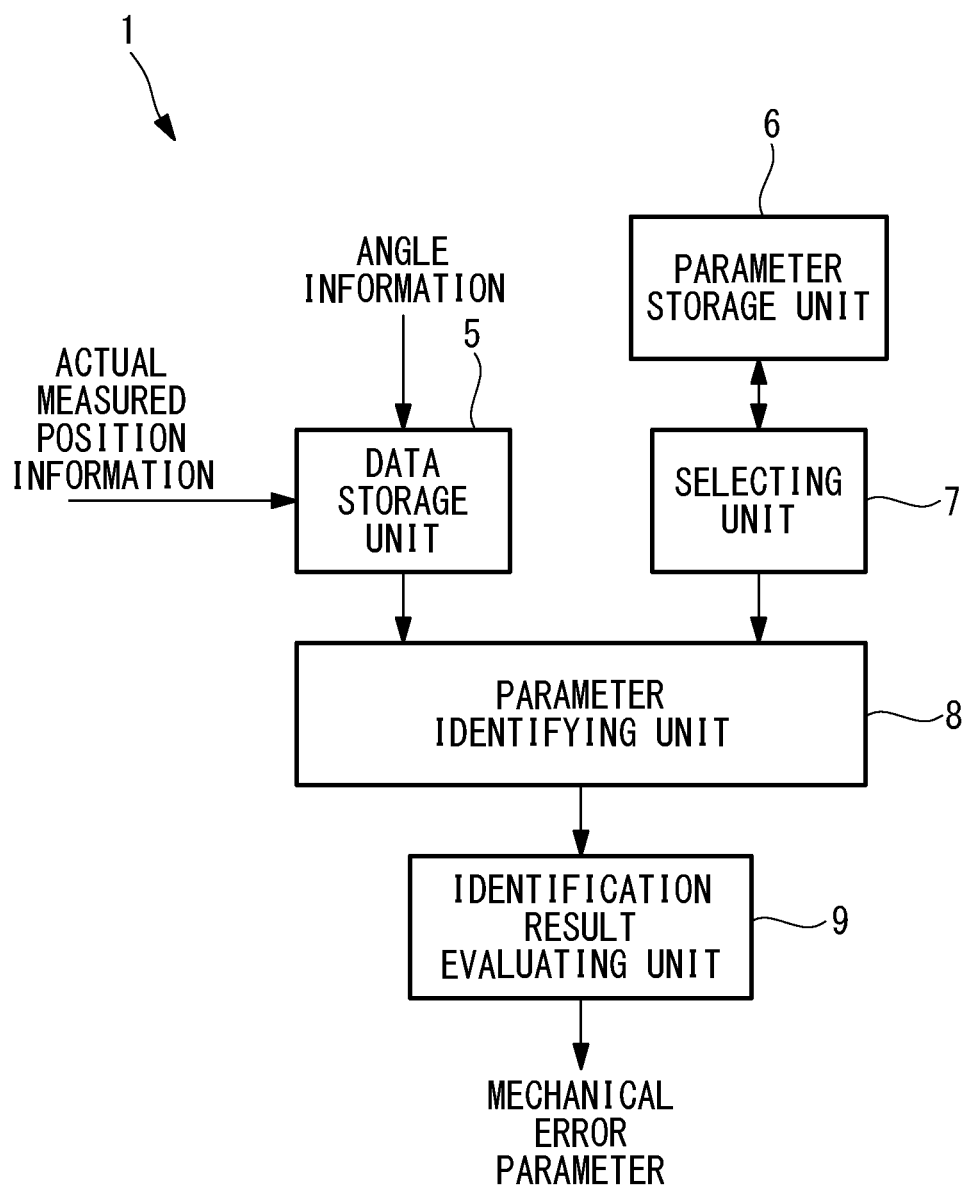
FIG. 2 is a block diagram illustrating the calibration system in FIG. 1.

As illustrated in FIG. 2, the calibration system 1 includes a data storage unit 5 which stores a plurality of pieces of data in which the actual measured position information actually measured using the three-dimensional position measuring equipment 4 is associated with information indicating a state of the robot 2 including angle information of each joint of the robot 2 at a time point at which the actual measured position information is actually measured, a parameter storage unit (parameter selecting unit) 6 which stores information of mechanical error parameters indicating mechanical errors of the robot 2, and a selecting unit (parameter selecting unit) 7 which selects mechanical error parameters to be identified among the mechanical error parameters stored in the parameter storage unit 6.

Further, the calibration system 1 includes a parameter identifying unit 8 which identifies the selected mechanical error parameters, and an identification result evaluating unit 9 which evaluates an identification result.

The data storage unit 5 and the parameter storage unit 6 are, for example, memories. The selecting unit 7, the parameter identifying unit 8 and the identification result evaluating unit 9 are configured with, for example, processors.

Figure 3:
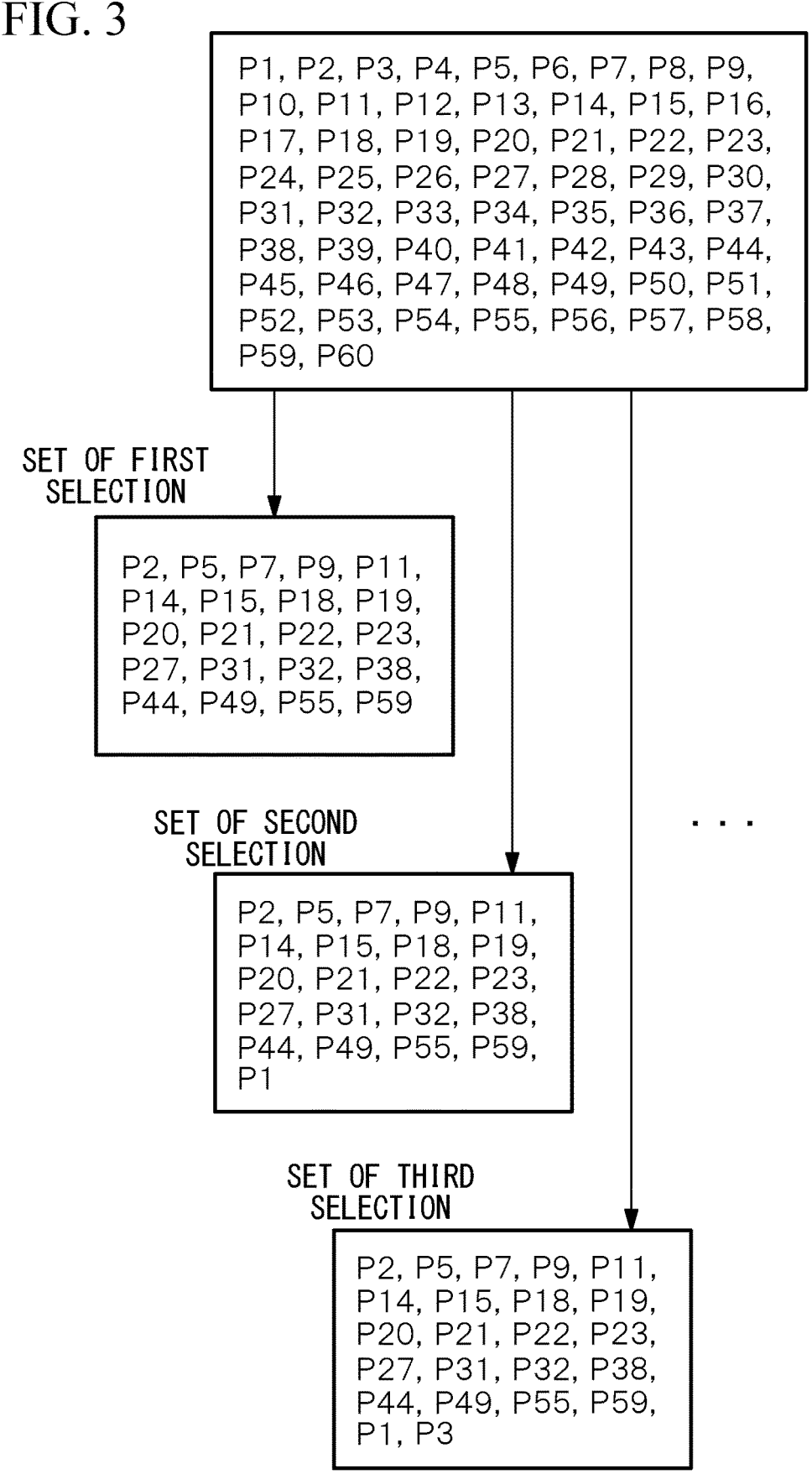
FIG. 3 is a diagram explaining selection of a set of mechanical error parameters by a parameter selecting unit of the calibration system in FIG. 2.

In the parameter storage unit 6, a plurality of candidates which can be selected as the mechanical error parameters are stored. In an example illustrated in FIG. 3, identification information of 60 candidates from P1 to P60 for mechanical error parameters is stored.

The selecting unit 7 selects a set including a plurality of candidates among the candidates stored in the parameter storage unit 6. In the first selection, predetermined mechanical error parameters may be selected, or mechanical error parameters may be arbitrarily selected. In the example illustrated in FIG. 3, a set including, for example, 21 mechanical error parameters among 60 mechanical error parameters stored in the parameter storage unit 6 are selected.

In the second and subsequent selection, mechanical error parameters which have not been selected so far may be randomly added, or some of the selected mechanical error parameters may be randomly deleted. Addition and deletion may be performed one by one or an arbitrary number at a time. In the example illustrated in FIG. 3, a mechanical error parameter P1 is added in the second selection, and a mechanical error parameter P3 is added in the third selection.

The parameter identifying unit 8 identifies the mechanical error parameters included in the set using a plurality of pieces of data stored in the data storage unit 5 and a set of the mechanical error parameters selected by the selecting unit 7 using a publicly known method. For example, the mechanical error parameters may be identified using a least-square method by creating error functions between the actual measured position of the tip position of the robot 2 stored in the data storage unit 5 and a theoretical position calculated using the actual measured position and the mechanical error parameters.

The identification result evaluating unit 9 evaluates a result identified by the parameter identifying unit 8 using a predetermined criterion. For example, errors between theoretical positions calculated using the identified set of mechanical error parameters and actual measured positions may be calculated for all the actual measured positions to determine whether or not an average value of the errors satisfies an evaluation criterion (for example, equal to or less than 0.3 mm).

A calibration method using the calibration system 1 of the robot 2 according to the present embodiment configured in this manner will be described below.

Figure 4:
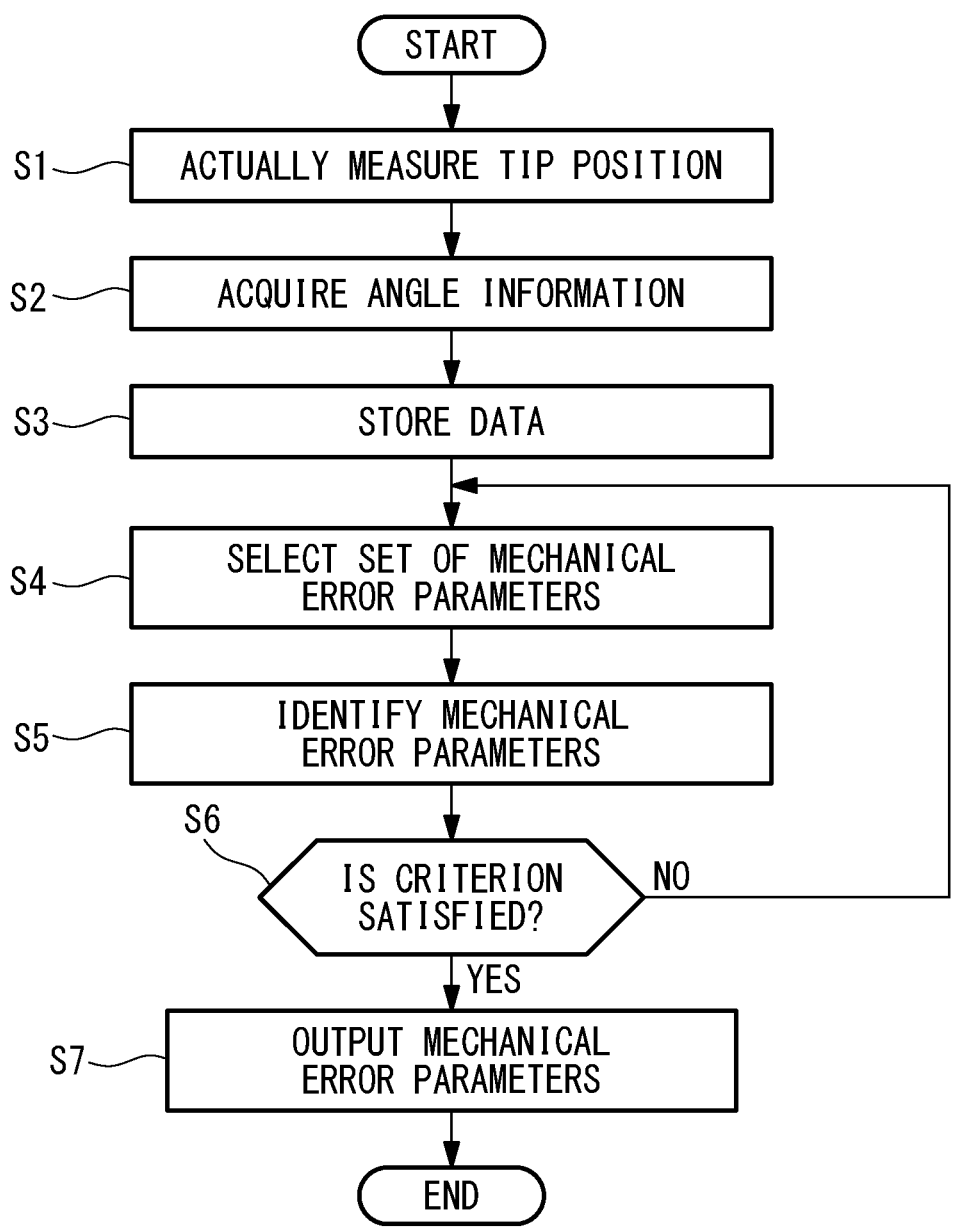
FIG. 4 is a flowchart explaining a calibration method using the calibration system in FIG. 2.

To perform calibration using the calibration system 1 according to the present embodiment, as illustrated in FIG. 4, first, each joint of the robot 2 which is an articulated type robot is caused to operate so that a tip is disposed at a plurality of positions, and tip positions are actually measured at the respective positions using the three-dimensional position measuring equipment 4 (step S1). Further, angle information of each joint of the robot 2 at the time point of actual measurement is acquired (step S2), and the acquired angle information is stored in the data storage unit 5 in association with the measured actual measured position (step S3).

Then, the selecting unit 7 selects a set of mechanical error parameters among candidates for the mechanical error parameters stored in the parameter storage unit 6 (step S4).

Then, the mechanical error parameters are identified using a least-square method by creating an error function of the theoretical positions calculated using the selected mechanical error parameters and the angle information stored in the data storage unit 5, and the actual measured positions (step S5).

Thereafter, whether or not an identification result satisfies a predetermined criterion is evaluated by the identification result evaluating unit 9 using the identified mechanical error parameters (step S6).

In the case where the identification result does not satisfy the criterion, the processing returns to step S4, and steps from step S4 for selecting a set different from the selected set of mechanical error parameters to step S6 are repeated.

In the case where the identification result satisfies the criterion in step S6, the mechanical error parameters identified at that time point are output to the control device 3 (step S7).

In this manner, according to the calibration system 1 of the robot 2 and the calibration method according to the present embodiment, because a set of mechanical error parameters for which the identification result satisfies the predetermined criterion is searched for instead of only the mechanical error parameters determined in advance being identified, advantages are provided that it is possible to improve absolute accuracy of a tip of the robot 2 by identifying an appropriate number and appropriate types of mechanical error parameters.

That is, even in the case where it is impossible to prepare data including the actual measured positions and the theoretical positions of a necessary number and for necessary positions on a user side, by searching for a set of mechanical error parameters for which the identification result satisfies the predetermined criterion, it is possible to improve absolute accuracy of the tip of the robot 2.

Note that, while, in the present embodiment, the angle information of each rotary joint detected by the encoder is described as an example of the information indicating the state of the robot 2, it is also possible to employ other information such as torque and external force, detected by a sensor or calculated from other information in place of or in addition to the angle information.

Figure 5:
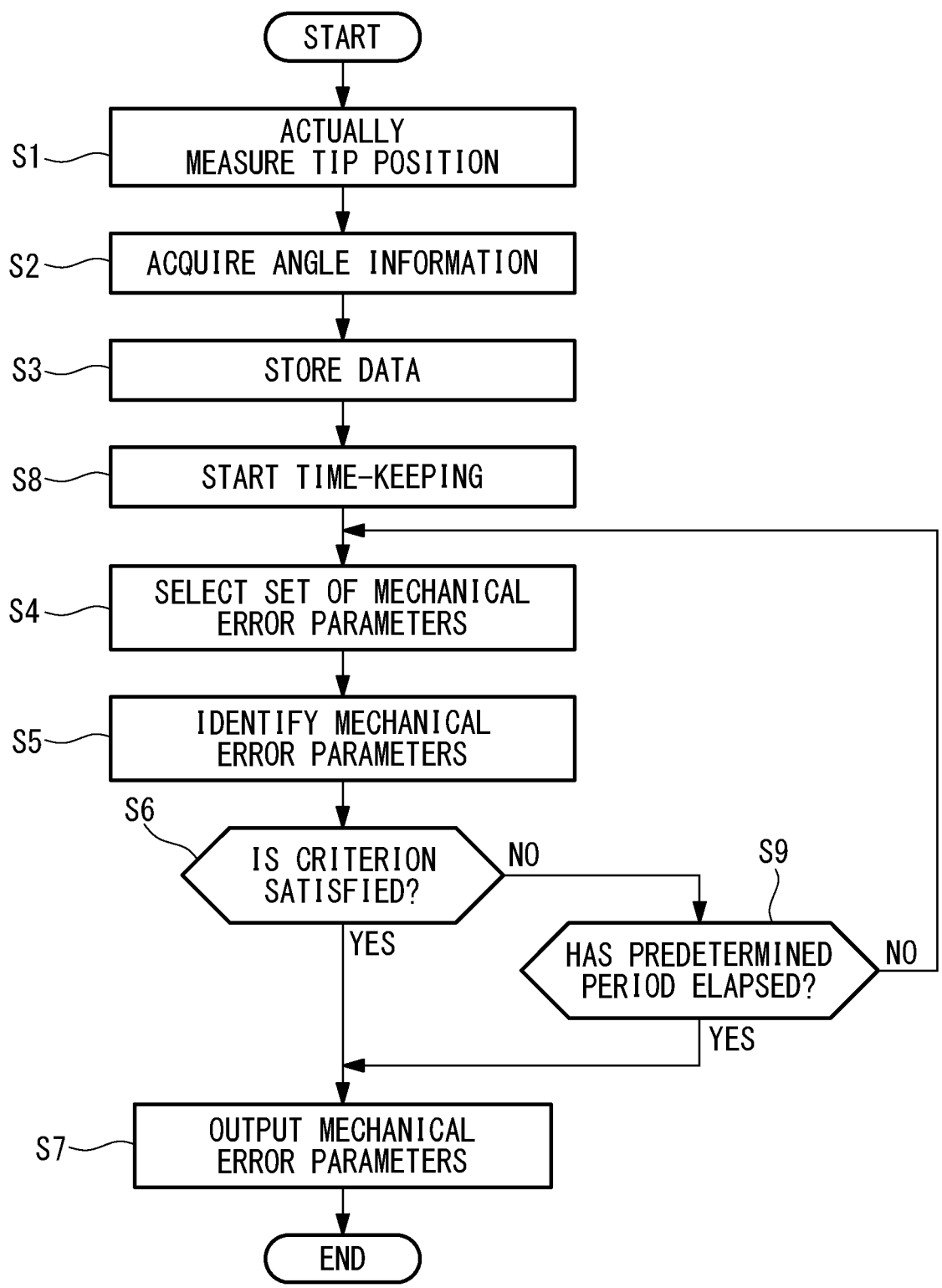
FIG. 5 is a flowchart illustrating a first modified example of the calibration method in FIG. 4.

Further, while, in the present embodiment, selection, identification and evaluation of the mechanical error parameters are repeated until the identification result satisfies the predetermined criterion, in place of this, as illustrated in FIG. 5, it is also possible to employ a configuration where time-keeping is started at a time point at which a selection of a set of mechanical error parameters is started (step S8), and, in the case where the identification result does not satisfy the criterion, whether or not a predetermined time period has elapsed is determined (step S9).

That is, in the case where the predetermined time period has not elapsed, the processing may return to step S4, and selection, identification and evaluation of the mechanical error parameters may be repeated, and, in the case where the predetermined time period has elapsed, the mechanical error parameters indicating the identification result closest to the criterion at that time point may be output (step S7). By this means, while it takes a lot of time until the criterion is satisfied in the case where a strict criterion for evaluation is set, by performing processing while limiting a period, it is possible to set the mechanical error parameters indicating the identification result close to the criterion in a short period of time.

Figure 6:
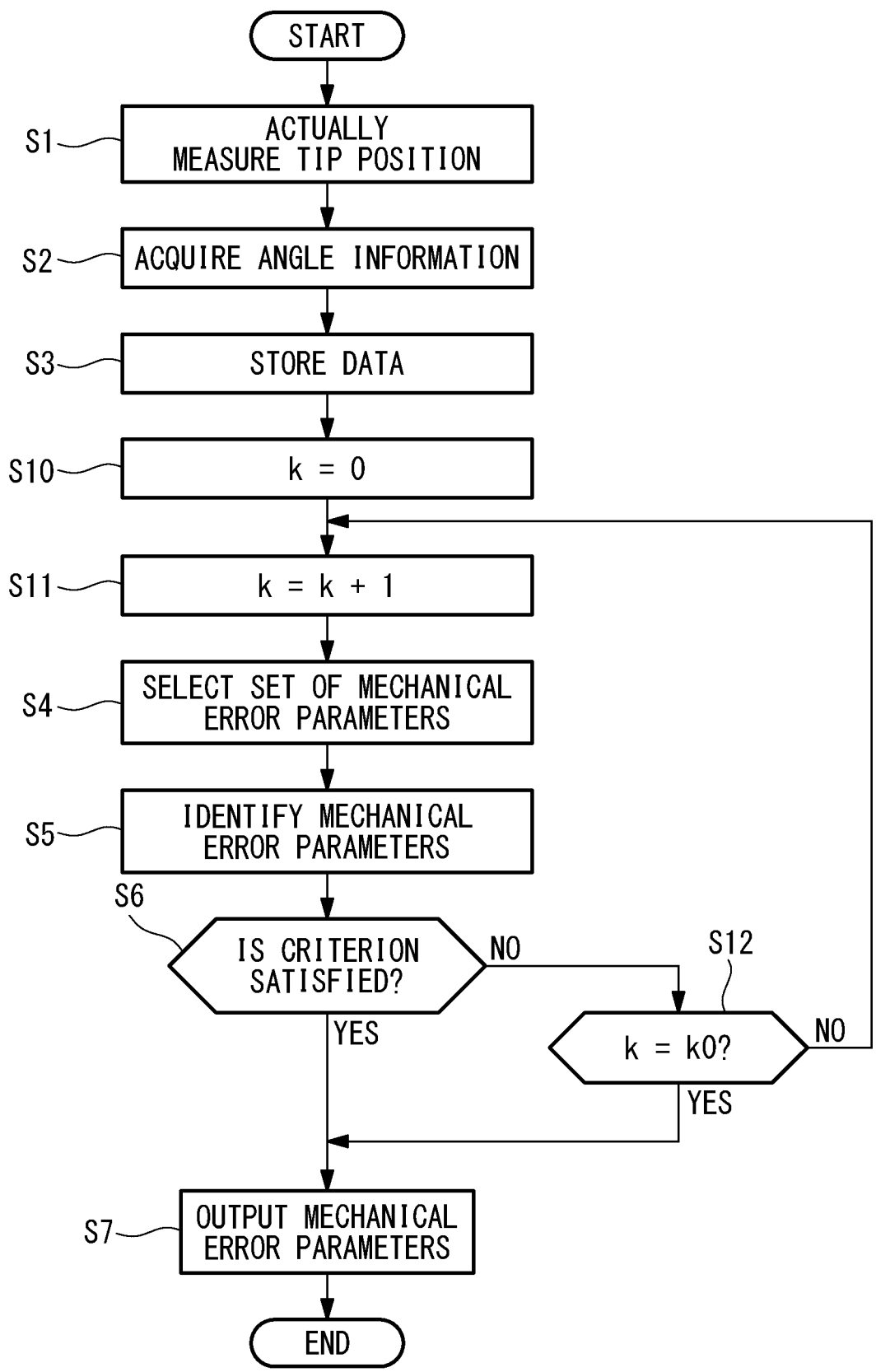
FIG. 6 is a flowchart illustrating a second modified example of the calibration method in FIG. 4.

Further, rather than performing processing while limiting the elapsed period, it is also possible to, in the case where the number of times of selection k of a set of mechanical error parameters reaches a predetermined number of times, output the mechanical error parameters indicating the identification result closest to the criterion at that time point, as illustrated in FIG. 6. In the drawing, the number of times of selection k is reset before selection is started (step S10), and incremented (step S11). Then, in the case where the identification result does not satisfy the criterion, it is determined whether or not selection is performed a predetermined number of times k0 (step S12). In the case where selection is not performed the predetermined number of times k0, the processing returns to step S4, and selection, identification and evaluation of the mechanical error parameters are repeated.

Also by this means, while it takes a lot of time until the criterion is satisfied in the case where a strict criterion for evaluation is set, by performing processing while limiting the number of times of repetition, it is possible to set the mechanical error parameters indicating the identification result close to the criterion in a short period of time.

From the above-described embodiment, the following invention is derived.

One aspect of the present invention is a calibration system of a robot including a data storage unit that stores a plurality of pieces of data in which actual measured position information obtained by actually measuring a tip position of the robot and information indicating a state of the robot upon actual measurement of the actual measured position information are combined, a parameter selecting unit that selects mechanical error parameters to be identified from parameters indicating mechanical errors of the robot, a parameter identifying unit that identifies each of the mechanical error parameters using the data stored in the data storage unit and information of the mechanical error parameters selected by the parameter selecting unit, and an identification result evaluating unit that evaluates an identification result by the parameter identifying unit, in which, in the case where evaluation by the identification result evaluating unit does not satisfy a predetermined criterion, selection of different mechanical error parameters by the parameter selecting unit, identification by the parameter identifying unit and evaluation by the identification result evaluating unit are repeated.

According to the present aspect, a plurality of pieces of data in which the actual measured position information obtained by actually measuring the tip position of the robot and the information indicating the state of the robot upon actual measurement of the actual measured position information are combined are stored in the data storage unit, and mechanical error parameters to be identified are selected from the parameters indicating mechanical errors of the robot by the parameter selecting unit. The parameter identifying unit identifies the mechanical error parameters using the selected mechanical error parameters and the plurality of pieces of stored data, and the identification result evaluating unit evaluates the identification result. In the case where the evaluation does not satisfy the predetermined criterion, different mechanical error parameters are selected by the parameter selecting unit, and identification by the parameter identifying unit and evaluation by the identification result evaluating unit are repeated.

In the case where a predetermined number of pieces of the actual measured position information of the tip position determined in advance can be stored in the data storage unit, the mechanical error parameters to be used for calculation of the tip position can be specified upon shipment of the robot. However, in the case where the number of pieces of data stored in the data storage unit is insufficient, or in the case where the actual measured position information at the tip position determined in advance cannot be obtained, there is a case where it is impossible to improve the absolute position accuracy of the tip of the robot even if the mechanical error parameters specified upon shipment are used.

According to the present aspect, even in the case where the number of pieces of data stored in the data storage unit is insufficient, or even in the case where the actual measured position information at the tip position determined in advance cannot be obtained, because the mechanical error parameters selected from the parameters are identified, the identification result is evaluated, and, in the case where the identification result does not satisfy the predetermined criterion, selection, identification and evaluation of different mechanical error parameters are performed, it is possible to set mechanical error parameters closer to the above-described criterion. By this means, it is possible to improve absolute position accuracy of the tip position of the robot calculated using the information indicating the state of the robot and the mechanical error parameters.

In the above-described aspect, the information indicating the state of the robot may include an angle of each joint of the robot at a time point at which the actual measured position information is actually measured.

According to this configuration, it is possible to improve absolute position accuracy of the tip position of the robot calculated using the angle of each joint of the robot and the mechanical error parameters.

Further, in the above-described aspect, the information indicating the state of the robot may include torque acting on each joint of the robot at a time point at which the actual measured position information is actually measured.

According to this configuration, it is possible to improve absolute position accuracy of the tip position of the robot calculated using the torque acting on each joint of the robot and the mechanical error parameters.

Further, in the above-described aspect, in the case where evaluation by the identification result evaluating unit does not satisfy the criterion within a predetermined time period, the mechanical error parameters with the highest evaluation obtained so far may be set as the mechanical error parameters to be used.

According to this configuration, even in the case where the identification result does not satisfy the criterion although selection of the mechanical error parameters is switched, it is possible to set a set of appropriate mechanical error parameters without taking excessive time.

Further, in the above-described aspect, in the case where the evaluation by the identification result evaluating unit does not satisfy the criterion even through a predetermined number of times of selection of the mechanical error parameters, the mechanical error parameters with the highest evaluation obtained so far may be set as the mechanical error parameters to be used.

According to this configuration, even in the case where the identification result does not satisfy the criterion although selection of the mechanical error parameters is switched, it is possible to set a set of more appropriate mechanical error parameters without taking excessive time.

Further, another aspect of the present invention is a calibration method of a robot including storing a plurality of pieces of data in which actual measured position information obtained by actually measuring a tip position of the robot and information indicating a state of the robot upon actual measurement of the actual measured position information are combined, selecting mechanical error parameters to be identified from parameters indicating mechanical errors of the robot, identifying each of the mechanical error parameters using the stored data and information of the selected mechanical error parameters, evaluating an identification result, and, in the case where evaluation does not satisfy a predetermined criterion, repeating selection of different mechanical error parameters, identification and evaluation.

The invention claimed is:

1. A calibration system of a robot, comprising:
a processor; and
a memory that stores a plurality of parameters in which mechanical errors are described, the plurality of parameters being candidates of mechanical error parameters to be used for the robot,
wherein the processor is configured to:
perform selection of a set of parameters among the plurality of parameters;
perform identification of the selected set of parameters by using the selected set of parameters and a plurality of pieces of data, each of which associates an actual measured position of a tip position of the robot with information indicating a state of the robot upon measurement of the actual measured position;
perform determination of whether or not a result of performing identification satisfies a predetermined criterion;
in response to determining that the result does not satisfy the predetermined criterion, repeat performing selection, identification, and determination until the result satisfies the predetermined criterion; and
in response to determining that the result satisfies the predetermined criterion, output the selected set of parameters to a controller that controls the robot.

2. The calibration system of the robot according to claim 1, wherein the information indicating the state of the robot includes an angle of each joint of the robot upon measurement of the actual measured position.

3. The calibration system of the robot according to claim 1, wherein the information indicating the state of the robot includes torque acting on each joint of the robot upon measurement of the actual measured position.

4. The calibration system of the robot according to claim 1, wherein, in response to determining that the result does not satisfy the predetermined criterion, the processor is configured to repeat performing selection, identification, and determination until a predetermined runtime threshold is met, at which point the processor outputs the selected set of parameters which is closest to the predetermined criterion at that time point to the controller.

5. The calibration system of the robot according to claim 1, wherein, in response to determining that the result does not does not satisfy the predetermined criterion, the processor is configured to repeat performing selection, identification, and determination until an iteration threshold is met, at which point the processor outputs the selected set of parameters which is closest to the predetermined criterion at that time point to the controller.

6. A calibration method of a robot, comprising:
selecting a set of parameters among a plurality of parameters in which mechanical errors are described, the plurality of parameters being candidates of mechanical error parameters to be used for the robot;
identifying the selected set of parameters by using the selected set of parameters and a plurality of pieces of data, each of which associates an actual measured position of a tip position of the robot with information indicating a state of the robot upon measurement of the actual measured position; and
determining whether or not a result of identifying the selected set of parameters satisfies a predetermined criterion,
wherein, in response to determining that the result does not satisfy the predetermined criterion, selection, identification, and determination are repeated until the result satisfies the predetermined criterion; and
wherein, in response to determining that the result satisfies the predetermined criterion, the selected set of parameters is output to a controller that controls the robot.

* * * * *